United States Patent [19]
Sharpe

[11] 3,887,872
[45] June 3, 1975

[54] FREEZE CIRCUIT FOR AIRCRAFT RADIO NAVIGATION SYSTEMS

[75] Inventor: Claude A. Sharpe, Ft. Lauderdale, Fla.

[73] Assignee: The Bendix Corporation, Southfield, Del.

[22] Filed: Dec. 5, 1973

[21] Appl. No.: 421,881

[52] U.S. Cl. .................... 325/21; 325/22; 325/473
[51] Int. Cl. ........................ H04b 1/40; H04b 1/44
[58] Field of Search ......... 325/21, 22, 473; 343/228

[56] References Cited
UNITED STATES PATENTS
2,609,493   9/1952   Wilmotte ............................ 325/473
2,657,304   10/1953   Parks .................................. 325/21
3,689,845   9/1972   Hepp .................................. 325/473
3,991,353   7/1961   Barnes ................................. 325/17

Primary Examiner—Maynard R. Wilbur
Assistant Examiner—T. M. Blum
Attorney, Agent, or Firm—Bruce L. Lamb; W. G. Christoforo

[57] ABSTRACT

In aircraft, operation of on-board communications transmitter frequently interferes with radio navigation receiver. The invention provides switch means interposed between navigation receiver and course indicator or autopilot which, upon operation of transmitter, interrupts guidance signal from navigation receiver and holds input to course indicator or autopilot constant until navigation receiver has recovered from interference.

4 Claims, 1 Drawing Figure

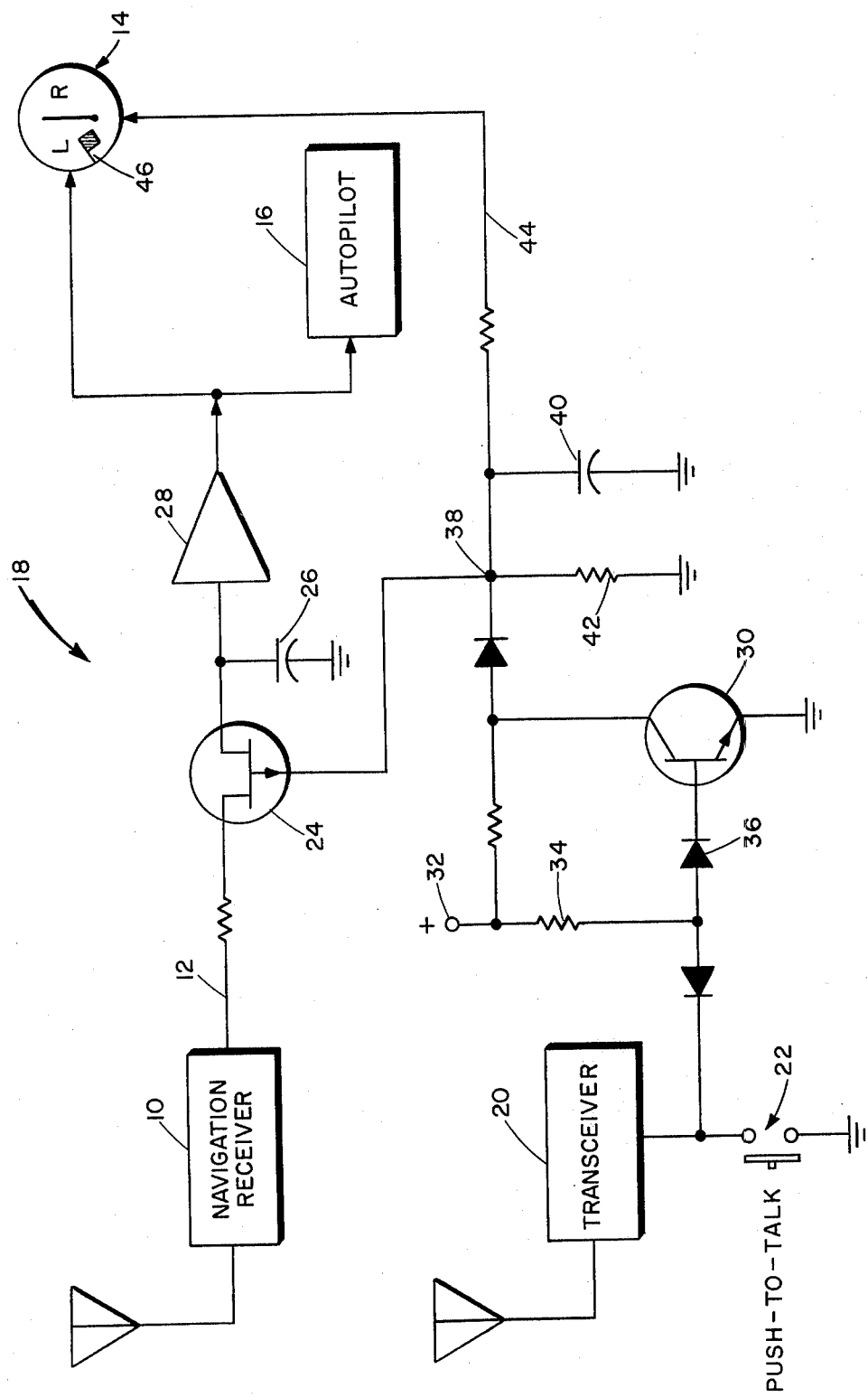

FREEZE CIRCUIT FOR AIRCRAFT RADIO NAVIGATION SYSTEMS

The present invention relates broadly to radio receivers for aircraft navigation and more particularly to means for preventing spurious outputs from such receivers from adversely affecting course indicators of an autopilot connected thereto.

Two widely used radio navigational aides are the VHF omni-range (VOR) and the fixed-beam low approach system, usually referred to as ILS. The VOR and the localizer beam of the ILS operate on channels assigned in the band of frequencies extending between 108.00 and 117.95 MHz. Channels within the band 118.00 to 151.95 MHz are used for communication. In many of the less refined receivers used in light aircraft it has been observed that operating a transmitter tuned to a channel near the lower end of the communications band causes a disturbance in the output of a navigation receiver tuned to a channel near the upper end of the navigation band. The disturbance appears as an erroneous indication on the course deviation or other guidance instrument or as a false command signal to the aircraft autopilot, if the latter is coupled for automatic guidance.

The cause of such erratic performance by the navigation receiver is overloading of the receiver by transmitter harmonics or cross modulation between the transmitted and received signals. The problem can be eliminated by improving the design of the transmitting and receiving equipment but that solution increases the cost of the equipment considerably. The majority of the light plane owners cannot afford to purchase equipment capable of meeting airline or military specifications and would lose the benefits of radio navigation if the more expensive equipment were all that were available.

It is an object of the present invention to provide means for preventing the operation of an on-board transmitter in an aircraft from adversely affecting guidance of the aircraft by a navigation receiver.

It is a further object of the invention to provide means for suppressing the appearance of false guidance signals from an aircraft navigation receiver without requiring elaborate and expensive improvements in the design of the receiver.

Other objects and advantages of the invention will become evident as an understanding thereof is gained through study of the following description and accompanying drawing.

Briefly, the invention comprises the interposition of a switching circuit between the navigation receiver output carrying the guidance signal and the course indicator as the autopilot which utilizes the guidance signal. Upon actuation, the switching circuit freezes the guidance signal entering the indicator or autopilot at the value prevailing at the moment of switch actuation and holds the same until lapse of a fixed delay following switch deactivation. In the preferred embodiment, switch actuation is controlled by the push-to-talk button of an on-board transmitter, thus freezing guidance signal during the time that false information is most likely to appear. The navigation warning flags are also actuated during the freeze of guidance signal to alert the pilot to the fact that guidance information is not then current.

The single FIGURE of the drawing is a functional block diagram, partially in schematic form, of the invention.

Referring to the drawing, a navigation receiver 10, which may be tuned either to a VOR or ILS localizer frequency, provdes guidance signal output on line 12. In a conventional installation, line 12 is connected directly to a course deviation indicator 14, or other indicator or to an autopilot 16. However, in accordance with the invention, line 12 is connected to a switching circuit 18 which controls application of the guidance signal to the indicator 14 or autopilot 16.

A source of spurious guidance signals in the less refined navigation receivers used in light planes is the transmitter of an on-board communications transceiver 20. Normally, both the receiver and transmitter of transceiver 20 are tuned to the same frequency in the communications band and are operated alternately to transmit or receive by closing and opening a push-to-talk switch 22. Closure of switch 22 ordinarily energizes an antenna relay transferring the transceiver antenna from the receiver to the transmitter, disables the receiver and enables the transmitter. In the preferred embodiment of the invention, closure of switch 22 also actuates switching circuit 18 to freeze guidance signal input to indicator 14 or autopilot 16.

In more detail, switching circuit 18 includes a field effect transistor 24 with line 12 connected to the drain there. The source electrode of transistor 24 is connected to a storage capacitor 26 and to the input of a unity gain, non-inverting, high input impedance amplifier 28. Operational amplifiers meeting the requirements of amplifier 28 are commercially available. The output of amplifier 28 is connected to the guidance signal inputs of indicator 14 or autopilot 16 to provide normal operation of these devices so long as transistor 24 is conductive. Transistor 24 is rendered non-conductive by application of reverse bias to the gate thereof by means including transistor 30 controlled by push-to-talk switch 22. When switch 22 is open, transistor 30 is forward biased into conduction by current from a positive voltage source 32 through resistor 34 and diode 36 into the base thereof. The voltage at junction 38 is then very nearly zero because transistor 30 effectively short circuits current from source 32 to the junction. When switch 22 is closed, bias current into the base of transistor 30 is short circuited, causing transistor 30 to become non-conductive and allowing current to flow into junction 38. A substantial increase in voltage occurs at junction 38 which is sufficient to reverse bias transistor 24 into non-conduction. As long as transistor 24 is conductive, the voltage across capacitor 26 follows the guidance signal output of navigation receiver 10 and indicator 14 and autopilot 16 respond to guidance signal changes. When transistor 24 becomes non-conductive, the value of the guidance signal at that moment is retained by capacitor 26 and remains constant because the high input impedance of amplifier 28 prevents capacitor discharge. The indicator and autopilot then operate as commanded by the constant voltage retained by capacitor 26 and are isolated from any false guidance signals appearing at the output of navigation receiver 10.

When the transmission of a message is completed push-to-talk switch 22 is released, restoring conduction to transistor 30. The reverse bias appearing at junction 38, however, is not immediately removed because of the delay effected by capacitor 40. Capacitor 40 discharges at a rate limited by resistor 42, the time constant being chosen to prevent restoration of conduction by transistor 24 prior to the recovery of navigation receiver 10 from the upsetting effect of the on-board transmitter. A typical value for the delay thus produced is 3 seconds. Following decay of the voltage on capacitor 40 to a level permitting conduction of transistor 24, indicator 14 and autopilot 16 resume operation in response to guidance signal output of the navigation receiver. Line 44 connected between indicator 14 and junction 38 applies the junction voltage to the warning flag circuit of the indicator to cause the warning flag 46 to appear during the time that the guidance signal input thereto is frozen at a constant value.

The invention has been described according to its preferred embodiment wherein switching circuit 18 is controlled by push-to-talk switch 22. An alternative embodiment is possible wherein switching circuit is controlled by a detector circuit tuned to the band of frequencies in the navigation band in which disturbances are noted upon operation of an on-board transmitter and adjusted to cause transistor 24 to become non-conductive whenever the detector output rises to a level associated with disruption of the guidance signal.

The invention claimed is:

1. In a radio navigation system, means for eliminating adverse effects of false guidance signals caused by intermittent transmissions from a nearby communications transmitter, said navigation system including a receiver tuned to a frequency within a band of frequencies assigned for navigation use and providing guidance signal output, and means utilizing said guidance signal output, said communications transmitter operating in a communications band of frequencies adjacent said navigation band of frequencies and being active to transmit or inactive depending upon the operation of a first switch means; comprising, second switch means interposed between said navigation receiver and said utilizing means, a first condition of said second switch means permitting application of guidance signal from said receiver to said utilizing means, a second condition of said second switch means interrupting application of said guidance signal to said utilizing means;

means for storing said guidance signal during the time said second switch means is in said first condition and for applying said stored guidance signal to said utilizing means as a substitute for said guidance signal during the time said second switch means is in said second condition; and means controlled by said first switch means and controlling said second switch means to cause said second switch means to change from said first condition to said second condition whenever said transmitter is active and to revert said second switch means to said first condition whenever said transmitter is inactive.

2. The combination of claim 1 wherein said second switch means comprises a field effect transistor having an input electrode to which guidance signal from said receiver is applied, an output electrode for applying guidance signal to said utilizing means and a control electrode, said means controlling said second switch means biasing said control electrode for conduction between said input and output electrodes in said first condition and for non-conduction between said input and output electrodes in said second condition.

3. The combination of claim 2 wherein said storage means comprises a capacitor and a high input impedance amplifier, the input of said amplifier being connected to said transistor output electrode, the output of said amplifier being connected to said utilizing means, said capacitor also being connected to said transistor output electrode.

4. The combination of claim 3 wherein said means controlling said second switch means includes means for delaying change of bias on said control electrode whenever said transmitter becomes inactive.

* * * * *